Sept. 15, 1953 J. E. WERNER 2,651,884
SELF-IRRIGATING PLANT RECEPTACLE
Filed Dec. 2, 1949 2 Sheets-Sheet 1
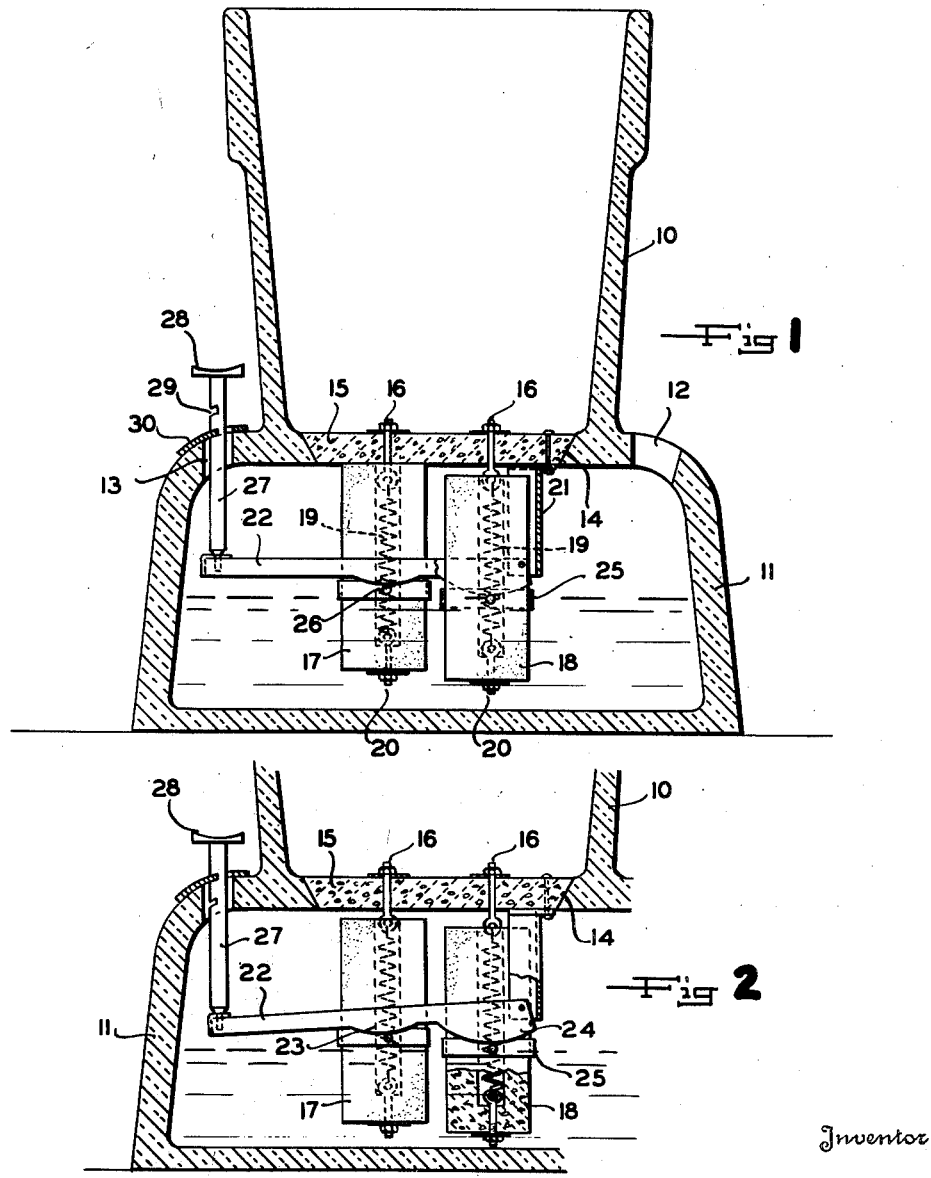
Inventor
JOHN E. WERNER Sept. 15, 1953
J. E. WERNER
2,651,884
SELF-IRRIGATING PLANT RECEPTACLE
Filed Dec. 2, 1949
2 Sheets-Sheet 2
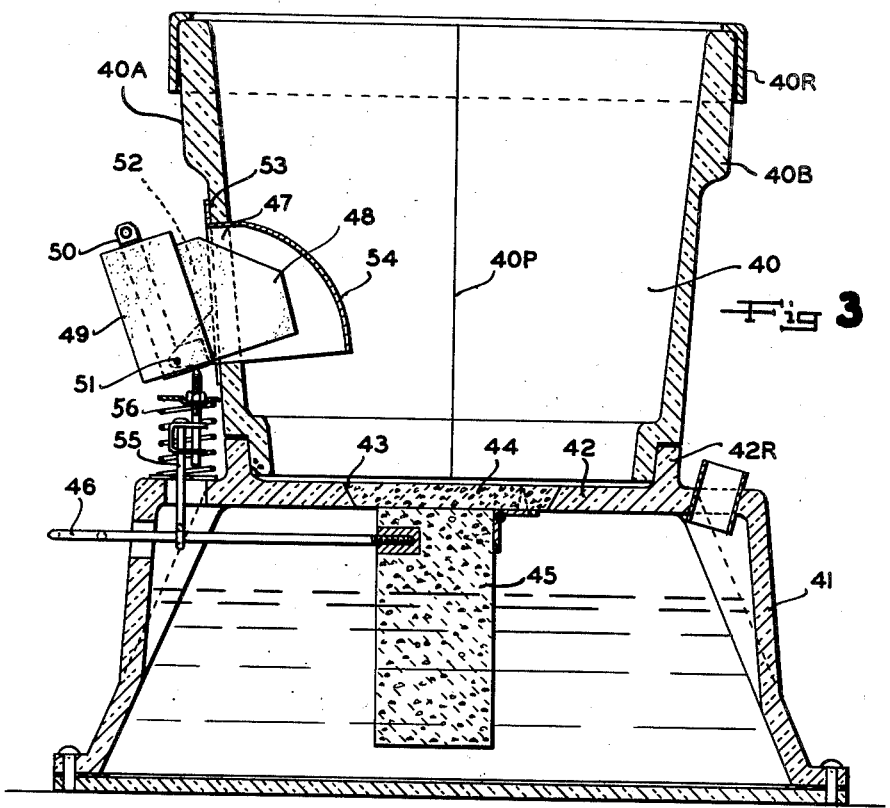
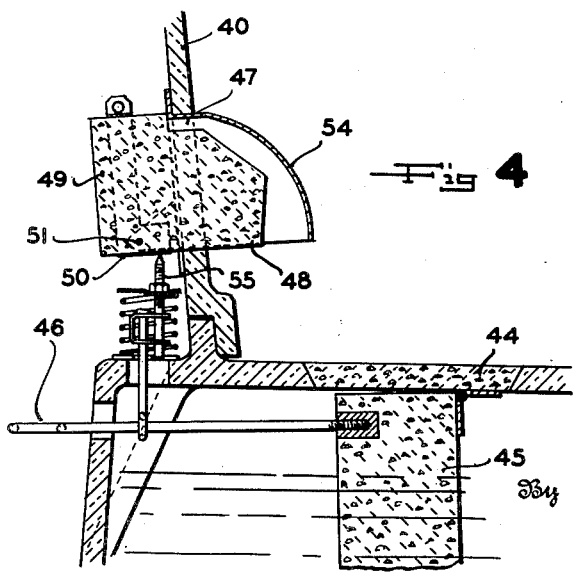
Inventor
JOHN E. WERNER Patented Sept. 15, 1953

2,651,884

UNITED STATES PATENT OFFICE 2,651,884

SELF-IRRIGATING PLANT RECEPTACLE

John E. Werner, Columbiana, Ohio

Application December 2, 1949, Serial No. 130,710

4 Claims. (Cl. 47—38)

This invention relates to improvements in plant receptacles and more particularly to improvements in plant receptacles of the irrigating type in which provision is made to controllably supply water to the soil or sand in which the roots of the plants contained in the receptacle are embedded.

The primary object of the invention is the provision in plant receptacles of the general kind mentioned above of improved and materially simplified arrangements for conducting moisture from any suitable water reservoir to the soil or sand about the roots of the plants and for controlling either manually or automatically the rate of flow or passage of the water to the soil or sand. This general object is accomplished by this invention by providing a materially improved and controlled path for the passage of the water in the reservoir to the soil or sand and the general improvement resides principally in the fact that the physical structure of the bath is exceedingly simple in design, economical to produce, light in weight, and in the fact that the physical material employed is not subject to deterioration or loss in efficiency even after long periods of use. A further object of the invention is the provision of improvements in self-irrigating plant receptacles wherein a uniform disbursion of the moisture supplied to the roots of the plants contained in the receptacles is automatically obtained while the rate of supply of the moisture may be controlled down to a low value so as not to impede the necessary aeration of the soil or sand while yet insuring that the roots of the plants obtain sufficient moisture for maximum growth. A still further object of the invention is the provision in plant receptacles of the self-irrigating type of an improved arrangement for automatically and continuously determining the moisture content of the soil or sand surrounding the roots of the plants contained in the receptacle and for automatically controlling the rate of transfer of water from the reservoir to the soil or sand in accordance with such determination.

More specific objects of the invention include the provision of improved plant receptacles having the characteristics outlined above, having special utility for household use and of novel plant trays for use in greenhouses having means for automatically supplying water or moisture to the roots of the plants housed in the tray. Also, the invention seeks to provide improved non-deteriorating porous material for conducting water or moisture from a reservoir or other suitable source to the soil surrounding the roots of plants housed in portable receptacles or trays.

The above and other objects and advantages of the invention will become apparent upon consideration of the following detailed specification and the accompanying drawing wherein there is disclosed a preferred embodiment of the invention.

In the drawing:

Figure 1 is a vertical section through a self-irrigating plant holder constructed in accordance with the principles of the invention;

Figure 2 is a fragmentary sectional view of the apparatus of Figure 1 showing some parts of the apparatus in different adjusted positions;

Figure 3 is a vertical section through a modified form of self-irrigating plant holder which is arranged for full automatic operation; and Figure 4 is a fragmentary sectional view of the apparatus of Figure 3, showing some of the parts in other operational positions.

Referring first to Figures 1 and 2, reference numeral 10 designates a ceramic plant holder to which is integrally attached a bulbous lower water-reservoir portion 11 having a filtering aperture 12 and a spaced control aperture 13 in its top wall. The reservoir 11 is provided with a flat bottom wall to provide a convenient support for the assembly and it will be understood that the material of the parts 10 and 11 will be of suitable nature or will be suitably coated to make the walls fluid impervious. An enlarged aperture having a bevelled side wall 14 is formed in the horizontal wall separating the holder 10 from the reservoir 11 and tightly positioned in this aperture is a disc 15 of a light-weight porous fired ceramic material of the kind normally used in making insulating brick. It will be understood by those familiar with the art that a wide variety of materials may be suitable for the purpose of the disc 15 but I have found specifically that a product made of mixing supple fire clay with sawdust and then drying and firing the mixture is entirely suitable as providing adequate strength and proper porosity for effecting efficient transfer therethrough of water by capillary action.

Depending downwardly through spaced apertures formed in the disc 15 is a pair of small eye bolts 16, the heads of which are received in the upper end portions of vertical bores formed in a pair of vertically extending cylindrical members 17 and 18. Members 17 and 18 are made of the same material as the disc 15 and they are yieldably urged into flat contact with the bottom surface of the disc 15 by coil springs 19 which are received in the bores aforesaid and which are anchored at their upper ends to the eye bolts 16 and at their lower ends to eye bolts 20 positioned in the lower end portions of the members. The members 17 and 18 extend almost to the bottom of the reservoir 11 and it will be obvious that if water is contained in the reservoir 11 and either or both of the members 17 and 18 are in flat contact with the disc 15 water will be transferred by capillary action through the members 17 and 18 and thence through the member 15 to the upper surface thereof. In actual practice the holder 10 will be filled with good garden soil to receive the roots or bulbs of the plant or plants and it is well known that the porous nature of such soil is an efficient conductor of moisture. In this manner the transfer of water in the reservoir to the roots or bulbs of the plants is effected.

To control and adjust the rate of transference of water to the plant or plants to suit requirements I provide an arrangement whereby either one or both of the members 17 and 18 may be moved and held away from the lower surface of the disc 15 whereby a reduced amount or no amount of water is transferred to and through the disc 15. For this purpose I secure a depending bracket 21 to one side of the disc 15 and pivotally mounted on this bracket is a yoke 22, the side members of which are each provided with a pair of spaced cam surfaces 23 and 24 on their lower edges. Surrounding the lower portion of each of the members 17 and 18 and rigidly secured thereto is a band 25 out of each of which extends a pair of diametrically disposed pins 26 arranged to be engaged by the cams 23 and 24 upon downward movement of the yoke 22. To adjust the vertical tilting movement of the yoke 22 I provide a rod 27 which at its lower end engages the yoke 22 and extends upwardly through the aperture 13 to a thumb piece 28. A pair of slots 29 are cut in the side of the rod 27 to engage over an edge of a curved metal plate 30 secured to the outer surface of the reservoir 11 in overlapping relation to the aperture 13. The springs 19 within the members 17 and 18 are of sufficient strength to normally retain the members 17 and 18 in contact with the disc 15 and the yoke 22 and rod 27 in full upper position. In this condition of the parts the transfer of water in the reservoir 11 to the soil in holder 10 will proceed at a maximum rate. If now the rod 27 is pushed downwardly to engage the lowermost of the notches 29 in the plate 30 the cams 24 will move the member 18 downwardly away from the disc 15 so that only one half as much moisture will be transferred to the soil. Upon further downward movement of the control rod 27 whereby the upper notches 29 may be engaged in the plate 30 both the water transferring members 17 and 18 will be moved away from the disc 15 and no water will be supplied to the soil. It should be understood that the notches 29 in the plate 30 provide a convenient means for locking the yoke 22 in adjusted position, the aperture 13 and the aperture in the plate 30 being sufficiently larger than the diameter of the rod 27 to allow the rod to slide upwardly and downwardly in these apertures before being tilted forwardly for engagement with an extending edge of the plate.

In the embodiment of the invention shown in Figures 3 and 4 a plate holder 40 is again positioned on a reservoir member 41 having an upper wall 42 in which is formed a tapered aperture 43 for receiving a porous disc 44 which is made of the same material as specified for the disc 15 of Figure 1. Hingedly mounted on the disc 44 is a block of porous ceramic material 45 which is also of the same material as used in the disc 44 and extending outwardly from the block 45 and rigidly secured thereto is an operating arm 46.

The embodiment of the invention shown in Figures 3 and 4 is arranged for entirely automatic operation and for this purpose the side wall of the holder 40 is formed with an aperture 47 in which is received an extension 48 of a block 49 which is carried by a saddle-like strap 50. The block 48—49 is likewise of porous ceramic material capable of absorbing an appreciable quantity of water and the strap 50 carrying it is pivotally mounted at a point 51 which is positioned to the left (as viewed in Figures 3 and 4) of the center of mass of the block so that upon the block containing more absorbed water the tendency of the block to rotate in a clockwise direction is increased. The pivotal connection is formed by a pin as shown extending between a pair of ears 52 which is integral with a metal ring 53 applied to the outer surface of the holder 40 about the aperture 47. A metal hood 54 is carried by the ring 53 and extends inside the holder to keep the soil away from the extension 48 but it should be understood that upon the holder 40 being filled with soil the same will rise a slight amount in the hood to lightly contact the extension 48 so that the block 48—49 will thereupon become saturated to a degree commensurate with the concentration of moisture in the soil. A rod 55 adjustable as to length and urged to upper position by a coil spring 56 has a looped lower end engaged under the control rod 46 and a pointed upper end bearing against an integral tab of the strap 50 at a point to the right of the pivot point 51, as viewed in Figures 3 and 4.

The above described parts of the apparatus of Figures 3 and 4 are so proportioned and adjusted that upon the soil in holder 40 becoming overly moist (as eventually occurs when the block 45 has full end contact with the disc 44 as shown in Figure 3) the water absorbed by the block 48—49 will make the block sufficiently heavy to tilt downwardly in a clockwise direction against the action of the spring 56, thereby lowering the control rod 46 and breaking the flat contact between disc 44 and block 45 as shown in Figure 4. This substantially stops all transfer of water from the reservoir to the soil and upon the soil and the control block 48—49 drying out to a certain predetermined degree the control block will rise under the action of the spring 56 allowing the upper end of the water transfer block 45 to again have flat contact with the disc 44 whereby the supply of water to the soil is restored. In this manner the moisture content of the soil in the holder 40 is maintained at a desired value entirely automatic so long as the reservoir 41 contains any appreciable amount of water.

To facilitate emptying of the holder 40 when changing plants or soil I construct the holder 40 in two separable parts 40A and 40B separated by a vertical cleavage plane 40P and the lower end portions of the semi-circular parts 40A and 40B may be retained in an upstanding annular rib 42R which is formed integrally with the top wall 42 of the reservoir 41. The upper ends of the parts 40A and 40B are locked together by a flanged metal rim 40R which may be of decorative stainless steel or other suitable material as will be understood. Now when it is desired to remove the soil from the holder 40 it is only necessary to remove the rim 40R, fold the sections 40A and 40B outwardly and then remove the potted soil as a single lump. It is also possible, of course, to simply lift the assembled holder 40 off the reservoir 41 and then remove the soil by turning the holder upside-down. This general arrangement avoids the necessity of emptying or handling the reservoir 41 and it should be understood that the same general arrangement is equally applicable to the embodiment of the invention shown in Figures 1 and 2.

The above specifically described embodiments of the invention should be considered as illustrative only as obviously many changes may be made therein without departing from the spirit or scope of the invention. Reference should therefore be had to the appended claims in determining the scope of the invention.

I claim:

1. In a self-irrigating plant receptacle having a lower water reservoir and an upper chamber for potting soil the combination of a bottom wall for said chamber formed of porous material capable of transmitting water by capillary action, a depending water transmitting block of similar material posiitoned below said bottom wall and adapted to have its lower end portion immersed in the water in said reservoir, said block having an upper end surface of substantial area, resilient means for urging the upper end surface of said block into physical contact with a substantial area of the lower surface of said wall, and means to move said block away from said wall whereby said upper surface area of said block may be moved out of contact with said lower surface of said wall.

2. Apparatus according to claim 1 wherein said means comprises a member movable in response to the amount of moisture transmitted to the soil in said chamber, and linkage means interconnecting said member and said block for moving the said block automatically out of contact with said wall in response to a predetermined increase in the moisture content of said soil.

3. Apparatus according to claim 2 further characterized in that said member comprises an eccentrically pivoted porous block adapted to gain weight upon increase of water absorption, an opening in the side wall of said chamber, a bulbous guard in said chamber about said opening to keep the soil contained in said chamber away from said opening, and said block being pivotally mounted on said chamber outside said opening and having an integral portion extending through said opening and housed in said guard.

4. In a self-irrigating plant receptacle having a lower water reservoir and an upper chamber for potting soil the combination of a bottom wall for said chamber formed of porous material capable of transmitting appreciable quantities of water by capillary action, a pair of depending water transmitting blocks of similar material positioned below said wall and adapted to have their lower end portions immersed in the water contained in said reservoir and to have their upper end surfaces brought into intimate contact with the bottom surface of said wall, resilient means urging said blocks into contact with said wall whereby water may be transmitted from said reservoir to said soil through a capillary path, and a control lever having operating means engageable outside said reservoir and connected to said blocks, to move one or both of said blocks out of contact with said wall.

JOHN E. WERNER.

References Cited in the file of this patent

UNITED STATES PATENTS

| Number | Name | Date |
|---|---|---|
| 2,031,146 | Dodge | Feb. 18, 1936 |
| 2,072,185 | Schein | Mar. 2, 1937 |
| 2,084,005 | Richards | June 15, 1937 |
| 2,130,234 | Haglund | Sept. 13, 1938 |
| 2,445,717 | Richards | July 20, 1948 |

OTHER REFERENCES

Popular Science, May 1939 (page 137).